United States Patent
Bergenstråle et al.

(10) Patent No.: US 9,796,168 B2
(45) Date of Patent: Oct. 24, 2017

(54) LIFT SYSTEMS WITH CONTINUOUS IN-RAIL CHARGING

(71) Applicant: Liko Research & Development AB, Luleå (SE)

(72) Inventors: Robert Bergenstråle, Luleå (SE); Mattias Andersson, Södra (SE)

(73) Assignee: LIKO RESEARCH & DEVELOPMENT AB, Lulea (SE)

( * ) Notice: Subject to any disclaimer, the term of this patent is extended or adjusted under 35 U.S.C. 154(b) by 452 days.

(21) Appl. No.: 14/606,705

(22) Filed: Jan. 27, 2015

(65) Prior Publication Data
US 2015/0136313 A1    May 21, 2015

Related U.S. Application Data

(63) Continuation of application No. 13/168,409, filed on Jun. 24, 2011, now Pat. No. 8,978,905.
(Continued)

(51) Int. Cl.
*B29C 65/50* (2006.01)
*B32B 37/12* (2006.01)
(Continued)

(52) U.S. Cl.
CPC ............ *B32B 37/20* (2013.01); *A61G 7/1042* (2013.01); *B32B 37/0046* (2013.01);
(Continued)

(58) Field of Classification Search
USPC ....... 156/249, 289, 324, 391, 538, 540, 543, 156/580, 582
See application file for complete search history.

(56) References Cited

U.S. PATENT DOCUMENTS 2,170,296 A    8/1939    Frank et al.
2,322,640 A    6/1943    Jackson et al.
(Continued)

FOREIGN PATENT DOCUMENTS

CH    669780 A5    4/1989
DE    3432045 A1    3/1986
(Continued)

OTHER PUBLICATIONS

English Abstract of JP 2007-253825 (Jun. 20, 2017).*
(Continued)

*Primary Examiner* — Sing P Chan
(74) *Attorney, Agent, or Firm* — Dinsmore & Shohl LLP (57) ABSTRACT

Rail-mounted lift systems are disclosed. In one embodiment, the lift system includes a rail having at least one conductor positioned on an upper interior surface of the rail. A carriage may be slidably disposed in the rail for relative movement to the rail. The carriage generally includes a carriage body, at least one pair of support wheels rotatably coupled to the carriage body and slidably engaged with the rail, and a conductor truck comprising at least one conductive roller rotatably attached to the conductor truck. The conductor truck may be mounted to the carriage body with a biasing member upwardly biasing the conductive roller into rolling engagement with the at least one conductor. A lift unit may be coupled to the carriage body and includes a motor paying out and taking up a lifting strap. The lift unit is electrically coupled to the at least one conductive roller.

20 Claims, 10 Drawing Sheets

Related U.S. Application Data (60) Provisional application No. 61/361,231, filed on Jul. 2, 2010.

(51) Int. Cl.
| | | |
|---|---|---|
| *B32B 37/20* | (2006.01) | |
| *B32B 37/26* | (2006.01) | |
| *B32B 38/10* | (2006.01) | |
| *B32B 39/00* | (2006.01) | |
| *B32B 43/00* | (2006.01) | |
| *B66C 19/00* | (2006.01) | |
| *A61G 7/10* | (2006.01) | |
| *B60L 5/40* | (2006.01) | |
| *B60M 1/34* | (2006.01) | |
| *B61B 3/02* | (2006.01) | |
| *B66C 7/02* | (2006.01) | |
| *B66C 9/02* | (2006.01) | |
| *B66C 11/00* | (2006.01) | |
| *B66D 3/18* | (2006.01) | |
| *B32B 37/00* | (2006.01) | |
| *B32B 37/02* | (2006.01) | |

(52) U.S. Cl.
CPC ............ *B32B 37/02* (2013.01); *B60L 5/40* (2013.01); *B60M 1/34* (2013.01); *B61B 3/02* (2013.01); *B66C 7/02* (2013.01); *B66C 9/02* (2013.01); *B66C 11/00* (2013.01); *B66C 19/00* (2013.01); *B66D 3/18* (2013.01)

(56) References Cited

U.S. PATENT DOCUMENTS

| | | | |
|---|---|---|---|
| 2,495,526 A | 1/1950 | King | |
| 2,793,860 A | 6/1955 | Crescenzo | |
| 2,921,146 A | 12/1957 | Ericson | |
| 2,962,563 A | 11/1960 | Davis | |
| 3,340,821 A | 3/1965 | Wesener | |
| 3,475,213 A | 10/1969 | Stow | |
| 3,590,173 A | 6/1971 | Stahmer | |
| 3,957,142 A | 5/1976 | Devolle | |
| 4,016,961 A | 4/1977 | Howell | |
| 4,026,757 A * | 5/1977 | Crawford | B44C 7/06 118/264 |
| 4,075,053 A * | 2/1978 | Adams | B05B 15/0456 156/391 |
| 4,125,908 A | 11/1978 | Vail et al. | |
| 4,174,246 A * | 11/1979 | Ralston | B65B 7/2864 156/214 |
| 4,202,064 A | 5/1980 | Joergensen | |
| 4,243,147 A | 1/1981 | Twitchell et al. | |
| 4,416,357 A | 11/1983 | Szysh | |
| 4,567,821 A * | 2/1986 | McDonald | B27F 7/155 100/100 |
| 4,843,971 A | 7/1989 | Braunagel | |
| 4,944,056 A | 7/1990 | Schroeder et al. | |
| 5,087,494 A | 2/1992 | Calhoun et al. | |
| 5,120,911 A | 6/1992 | Gazzola | |
| 5,138,953 A | 8/1992 | Horcher et al. | |
| 5,158,188 A | 10/1992 | Nordberg | |
| 5,281,488 A | 1/1994 | Pouisen | |
| 5,511,256 A | 4/1996 | Capaldi | |
| 5,570,483 A | 11/1996 | Williamson | |
| 5,605,209 A | 2/1997 | Clarke et al. | |
| 5,708,993 A | 1/1998 | Campbell et al. | |
| 5,709,154 A | 1/1998 | Schott | |
| 5,763,069 A | 6/1998 | Jordan | |
| 5,809,591 A | 9/1998 | Capaldi et al. | |
| 5,816,169 A | 10/1998 | MacKenzie | |
| 5,820,725 A * | 10/1998 | Maeda | B65H 37/005 156/391 |
| 5,939,857 A | 8/1999 | Madigan et al. | |
| 6,014,585 A | 1/2000 | Stoddard | |
| 6,098,685 A * | 8/2000 | Maeda | B65H 37/005 156/391 |
| 6,233,878 B1 | 5/2001 | Krahenbuhl et al. | |
| 6,235,385 B1 | 5/2001 | Lee | |
| 6,508,287 B1 * | 1/2003 | Shinozaki | B29C 63/024 156/391 |
| 6,585,023 B2 * | 7/2003 | Azuhata | B60R 13/00 156/574 |
| 6,601,630 B2 * | 8/2003 | Kang | B65H 37/005 156/574 |
| 6,637,610 B1 | 10/2003 | Cheeseboro | |
| 6,698,489 B1 * | 3/2004 | Shinozaki | B65H 37/005 156/574 |
| 6,748,993 B1 * | 6/2004 | Shinozaki | B29C 63/02 156/391 |
| 6,751,048 B2 * | 6/2004 | Ostwald | G05B 19/4068 360/69 |
| 6,796,351 B1 * | 9/2004 | Maeda | B65H 37/005 156/391 |
| 6,945,296 B2 * | 9/2005 | Kunz | B66B 1/3492 156/391 |
| 7,033,668 B2 | 4/2006 | Schumann et al. | |
| 7,093,641 B2 * | 8/2006 | Sharp | B65H 35/0013 156/353 |
| 7,152,651 B2 * | 12/2006 | Fujiwara | B65H 37/005 156/574 |
| 7,234,499 B2 * | 6/2007 | Fujino | B29C 63/024 156/391 |
| 7,237,491 B2 | 7/2007 | Faucher et al. | |
| 7,240,621 B2 | 7/2007 | Chepurny et al. | |
| 7,287,567 B2 * | 10/2007 | Fujiwara | B65H 37/005 156/166 |
| 7,299,845 B2 * | 11/2007 | Morimoto | B65H 37/005 156/391 |
| 7,481,952 B2 | 1/2009 | Ren et al. | |
| 7,506,678 B2 * | 3/2009 | Degawa | B29C 63/024 156/247 |
| RE40,885 E * | 9/2009 | Sharp | B65H 35/0013 156/353 |
| 7,634,825 B2 | 12/2009 | Chepurny et al. | |
| 7,950,434 B2 * | 5/2011 | Suzuki | B65H 35/0013 156/247 |
| 8,002,009 B2 * | 8/2011 | Anderson | B65H 37/005 156/391 |
| 8,146,643 B2 * | 4/2012 | Kasahara | B65H 35/0033 156/299 |
| 8,875,768 B2 * | 11/2014 | Stancu | B65H 35/0013 156/475 |
| 8,926,781 B2 * | 1/2015 | Cagle | B32B 21/08 156/269 |
| 8,997,816 B2 * | 4/2015 | Malik, Jr. | B65H 37/002 156/351 |
| 9,067,374 B2 * | 6/2015 | Schaaf | B29C 63/024 |
| 9,370,910 B2 * | 6/2016 | Schaaf | B29C 63/024 |
| 9,408,765 B2 * | 8/2016 | Andersson | A61G 7/1015 |
| 2002/0056525 A1 * | 5/2002 | Kang | B65H 37/005 156/574 |
| 2002/0062929 A1 * | 5/2002 | Azuhata | B60R 13/00 156/574 |
| 2002/0124967 A1 * | 9/2002 | Sharp | B65H 35/0013 156/378 |
| 2003/0002204 A1 * | 1/2003 | Ostwald | G05B 19/4068 360/92.1 |
| 2005/0098059 A1 | 5/2005 | Wallner | |
| 2006/0189453 A1 | 8/2006 | Leblond | |
| 2008/0216964 A1 * | 9/2008 | Degawa | B65H 37/005 156/538 |
| 2009/0050274 A1 * | 2/2009 | Suzuki | B65H 35/0013 156/510 |
| 2009/0077737 A1 | 3/2009 | Dyhr et al. | |
| 2009/0188628 A1 * | 7/2009 | Kasahara | B65H 35/0033 156/361 |
| 2009/0199335 A1 | 8/2009 | Guldmann | |
| 2010/0051889 A1 | 3/2010 | Chepurny et al. | |
| 2011/0000015 A1 | 1/2011 | Faucher et al. | |

(56) References Cited

U.S. PATENT DOCUMENTS

| | | | | |
|---|---|---|---|---|
| 2011/0252632 | A1* | 10/2011 | Stancu | B65H 35/0013 |
| | | | | 29/623.2 |
| 2012/0048448 | A1* | 3/2012 | Malik, Jr. | B65H 37/002 |
| | | | | 156/64 |
| 2012/0061019 | A1* | 3/2012 | Kasahara | B65H 35/0033 |
| | | | | 156/269 |
| 2012/0097313 | A1* | 4/2012 | Odawara | B65H 37/002 |
| | | | | 156/47 |
| 2013/0112346 | A1* | 5/2013 | Cagle | B32B 21/08 |
| | | | | 156/269 |
| 2014/0075669 | A1* | 3/2014 | Andersson | A61G 7/1015 |
| | | | | 5/85.1 |
| 2014/0150964 | A1* | 6/2014 | Schaaf | B29C 63/024 |
| | | | | 156/267 |
| 2015/0041068 | A1* | 2/2015 | Cagle | B32B 21/08 |
| | | | | 156/499 |
| 2015/0136328 | A1* | 5/2015 | Schaaf | B29C 63/024 |
| | | | | 156/516 |
| 2015/0306945 | A1* | 10/2015 | Gabel | B65H 37/005 |
| | | | | 49/475.1 |
| 2016/0338895 | A1* | 11/2016 | Andersson | A61G 7/1015 |
| 2016/0377225 | A1* | 12/2016 | Leibowits | F16M 11/18 |
| | | | | 248/323 |

FOREIGN PATENT DOCUMENTS

| | | |
|---|---|---|
| DE | 4010020 A1 | 10/1991 |
| DE | 4310666 A1 | 10/1994 |
| EP | 0078085 A1 | 5/1983 |
| EP | 1 671 835 A1 | 6/2006 |
| FR | 1235844 A | 7/1960 |
| GB | 737449 A | 9/1955 |
| GB | 1323892 A | 7/1973 |
| GB | 2207897 A | 2/1989 |
| JP | 56031830 A | 3/1981 |
| JP | 04197994 A | 7/1992 |
| JP | 6240533 A | 8/1994 |
| JP | 10286288 A | 10/1998 |
| JP | 2001112823 A | 4/2001 |
| JP | 2007253825 A * | 10/2007 ........... B65H 37/005 |
| JP | EP 1967476 A2 * | 9/2008 ........... B65H 37/005 |
| WO | WO94/22690 | 10/1994 |
| WO | WO0027333 A1 | 5/2000 |

OTHER PUBLICATIONS

European Search Report mailed Nov. 8, 2011 as it related to European Patent Application No. 11171726.
Extended European Search Report for EP Application No. 12192491.4; Mail Date: Jan. 8, 2013.
Extended European Search Report for EP Patent Application No. 1219492.2; Mail Date: Jan. 22, 2013.
Extended European Search Report dated Jun. 30, 2015 relating to EP Divisional Patent Application No. 15168148.3.

* cited by examiner

LIFT SYSTEMS WITH CONTINUOUS IN-RAIL CHARGING

CROSS REFERENCE TO RELATED APPLICATIONS

The present application is a continuation application of U.S. Non-Provisional patent application Ser. No. 13/168,409 entitled "Lift Systems with Continuous In-Rail Charging" filed on Jun. 24, 2011, which claims the benefit of and priority to U.S. Provisional Patent Application No. 61/361,231 entitled "Continuous In-Rail Charging For Lift Systems" filed Jul. 2, 2010, the entire disclosures of which are herein incorporated by reference.

TECHNICAL FIELD

The present specification generally relates to rail-mounted lift systems and, more specifically, to rail-mounted lift systems with continuous in-rail charging of the lift unit.

BACKGROUND

Overhead lifting devices, such as patient lifts used in the health care industry, may generally comprise a lift unit with an actuator, such as an electric motor or similar actuator, coupled to a mechanical lifting arm or cable lift system, such as a lifting strap. The actuator facilitates actuation of the mechanical lifting arm or cable lift system thereby raising and/or lowering a load attached to the lifting arm or cable lift system. The lift unit may be coupled to a rail system with a carriage which facilitates positioning the lift unit with respect to the rail. Positioning the unit along the rail system may be accomplished manually or, in the alternative, with a motor mechanically coupled to the carriage and operable to traverse the carriage and lift unit over the span of the rail system. The actuator and motor may be powered by a battery system positioned in the lift unit. In order to charge the battery system of the lift unit, the lift unit must be periodically coupled to a charging station requiring the lift unit to be moved to specific locations along the rail. Accordingly, during charging, the lift unit may not be used for lifting and transport.

Accordingly, a need exists for alternative mechanisms for continuously powering and/or charging a lift unit as the lift unit is traversed across a rail.

SUMMARY

In one embodiment, a rail-mounted lifting system includes a rail comprising at least one conductor positioned in a carriage support channel formed in the rail. A carriage may be slidably disposed in the rail for relative movement to the rail. The carriage may include at least one conductive roller rotatably attached to the carriage and upwardly biased into rolling engagement with the at least one conductor. A lift unit may be coupled to the carriage body and electrically coupled to the at least one conductive roller. The lift unit may include a motor paying out and taking up a lifting strap.

In another embodiment, a rail-mounted lifting system includes a rail, a carriage and a lift unit. The rail may include at least one conductor positioned on an upper portion of the rail, a first support flange, and a second support flange. A carriage may be slidably disposed in the rail for relative movement to the rail. The carriage may include a carriage body and at least one pair of support wheels rotatably coupled to the carriage body. The at least one pair of support wheels may be slidably engaged with the first support flange and the second support flange. The carriage may also include a conductor truck comprising at least one conductive roller rotatably attached to the conductor truck. The conductor truck may be mounted to the carriage body with a biasing mechanism which upwardly biases the at least one conductive roller into rolling engagement with the at least one conductor. The lift unit may be coupled to the carriage body and includes a motor paying out and taking up a lifting strap, wherein the lift unit is electrically coupled to the at least one conductive roller.

In yet another embodiment, a kit of parts for retrofitting an overhead rail for continuously charging a lift unit along a length of the rail may include a conductive tape and a carriage packaged together. The carriage generally includes a carriage body, and at least one pair of support wheels rotatably coupled to the carriage body. The carriage may also include at least one conductive roller rotatably attached to the carriage. The conductive roller is upwardly biased into rolling engagement with the conductive tape when the conductive tape and the carriage are installed in the rail.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
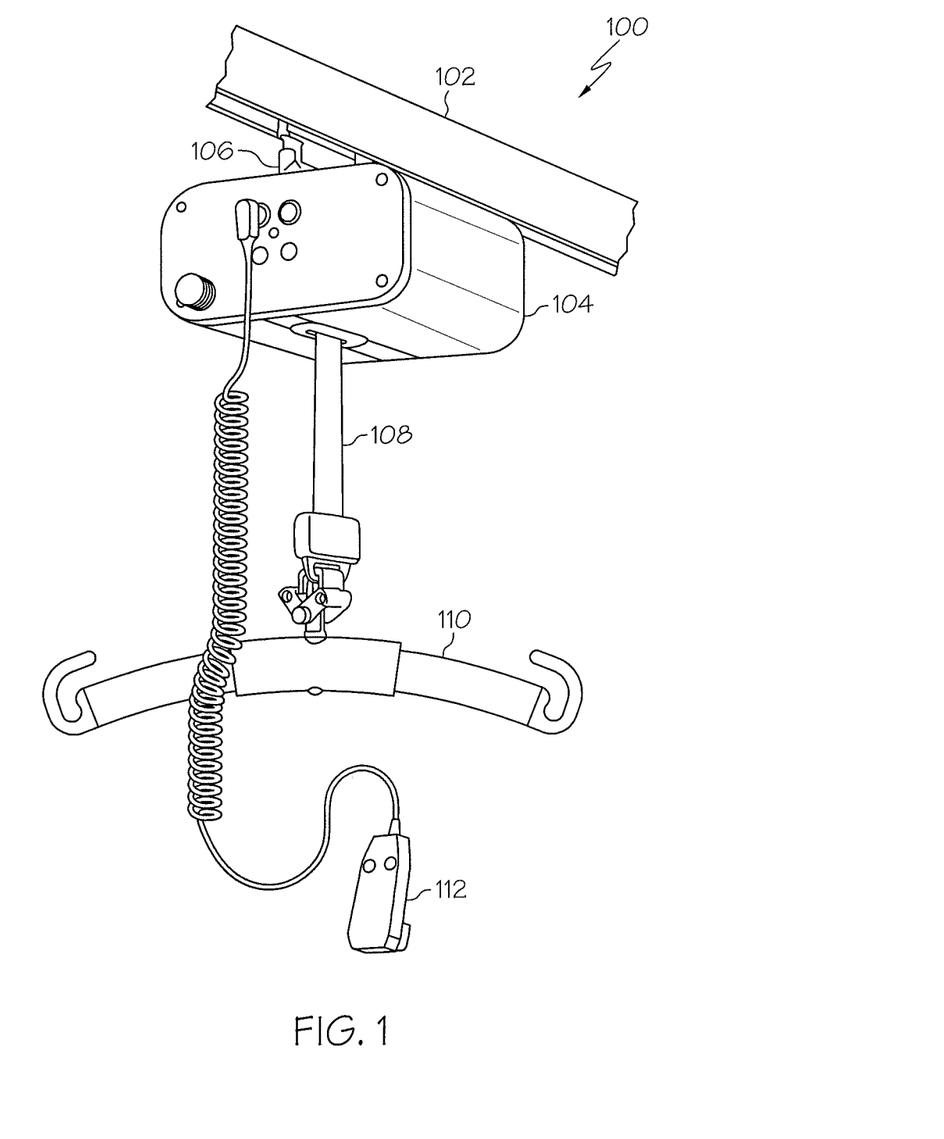
FIG. 1 schematically depicts a rail-mounted lift system, according to one or more embodiments described herein.

FIG. 1 generally depicts one embodiment of a rail-mounted lift system. The lift system generally comprises a lift unit slidably coupled to a rail with a carriage. The rail includes a conductor which is electrically coupled to a power supply. The carriage includes at least one conductive roller which is upwardly biased from the carriage into rolling engagement with the conductor. The conductive wheel is also electrically coupled to the lift unit thereby electrically coupling the lift unit to the conductor and the power supply and enabling the lift unit to be powered and/or charged along the entire length of the rail as the lift unit is traversed over the rail. The lift system and the various components of the lift system will be described in more detail herein with specific reference to the appended figures.

Figure 2:
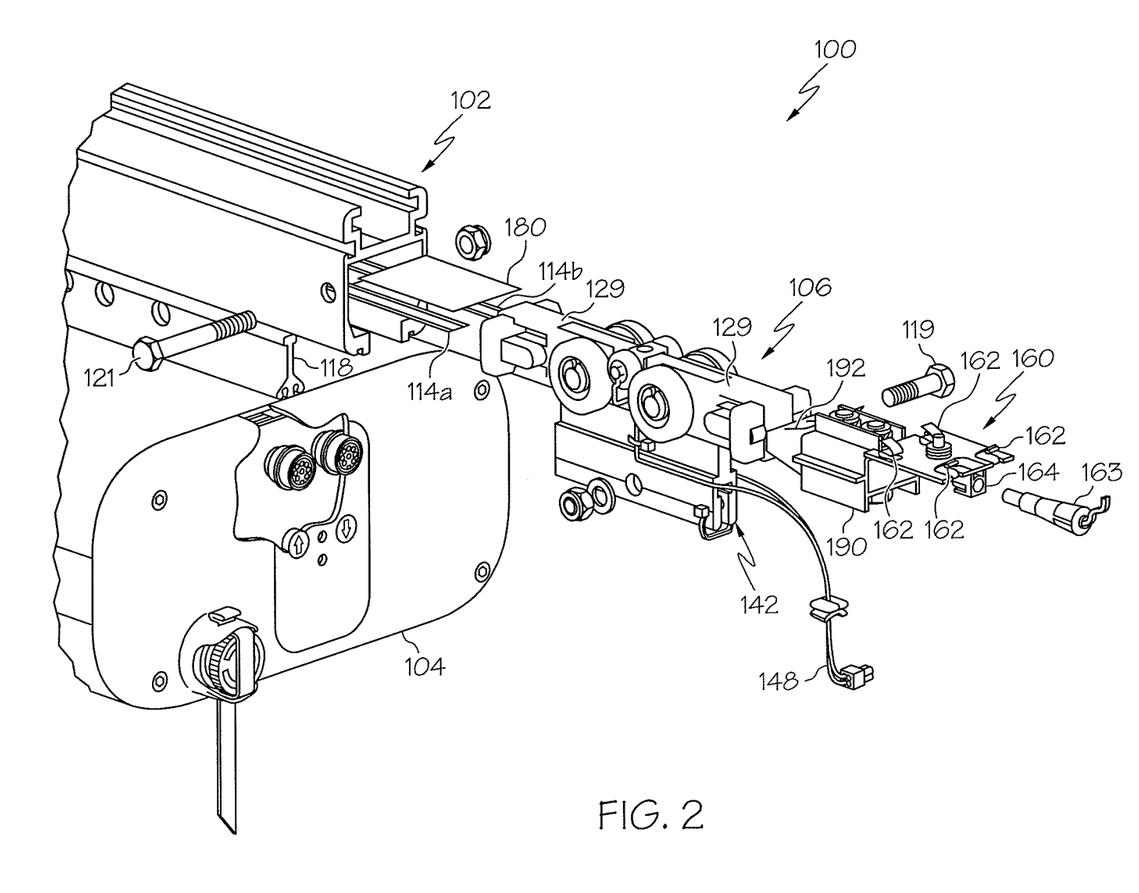
FIG. 2 schematically depicts an exploded view of the rail-mounted lift system of FIG. 1.
Figure 5:
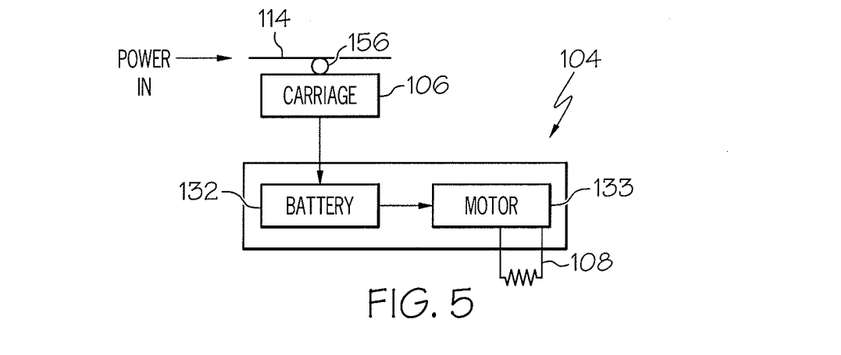
FIG. 5 schematically depicts the electrical interconnectivity of the various components of the rail-mounted lift system of FIG. 1.

Referring now to FIGS. 1, 2 and 5, the rail-mounted lift system 100 generally comprises a lift unit 104 which is slidably coupled to a rail 102 with a carriage 106. The lift unit 104 may be used to support and/or lift a patient with a lifting strap 108 which is coupled to a motor 133 contained within the lift unit 104. The motor 133 facilitates paying-out or taking-up the lifting strap 108 from the lift unit 104 thereby raising and lowering a patient attached to the lift strap. In the embodiments described herein, the lift unit 104 further includes a battery 132 which is housed in the lift unit 104 and electrically coupled to the motor 133 thereby providing power to the motor 133. However, it should be understood that, in other embodiments, the lift unit 104 may be constructed without the battery, such as when the motor is directly coupled to the conductors 114a, 114b located in the rail 102.

In the embodiment of the lift system 100 shown in FIG. 1, a patient may be attached to the lifting strap 108 with a sling bar 110 or a similar accessory attached to the lifting strap 108. More specifically, the sling bar 110 or a similar accessory may be attached to a harness or sling in which the patient is positioned thereby facilitating the lifting operation. The lift unit 104 may be actuated with hand control 112 which is communicatively coupled to the motor. In the embodiment shown in FIG. 1, the hand control 112 is directly wired to the lift unit 104. However, it should be understood that, in other embodiments, the hand control 112 may be wirelessly coupled to the lift unit 104 to facilitate remote actuation of the lift unit 104.

Referring now to the exploded view of the lift system 100 schematically depicted in FIG. 2, the lift unit 104 is mechanically coupled to a carriage 106 which facilitates slidably positioning the lift unit 104 along rail 102. In the embodiments of the lift unit 104 described herein, the lift unit 104 includes a connection rail 118 which is mounted to the top surface of the lift unit 104. The connection rail 118 facilitates connecting and securing the lift unit 104 to the carriage 106. In the embodiment of the lift unit 104 shown in FIG. 2, the connection rail 118 has a T-shaped configuration and the carriage 106 has a receiving slot 142 with a complimentary configuration for receiving the connection rail 118. The carriage 106 may be secured to the connection rail 118 with a fastener 119, such as a bolt and nut as depicted in FIG. 2, which extends transversely through openings in the carriage 106 and a corresponding opening in the connection rail 118.

Figure 3A:
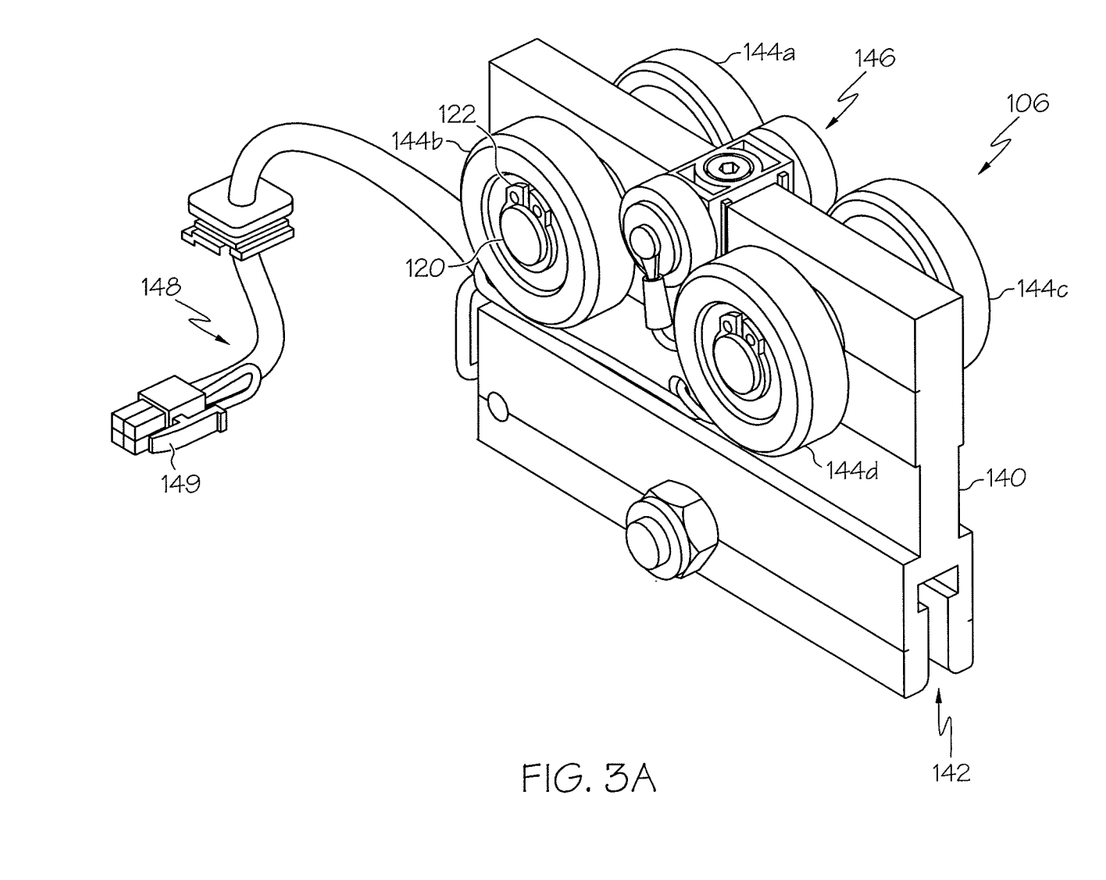
FIG. 3A schematically depicts a carriage for use with the rail-mounted lift system of FIG. 1, according to one or more embodiments described herein.
Figure 3B:
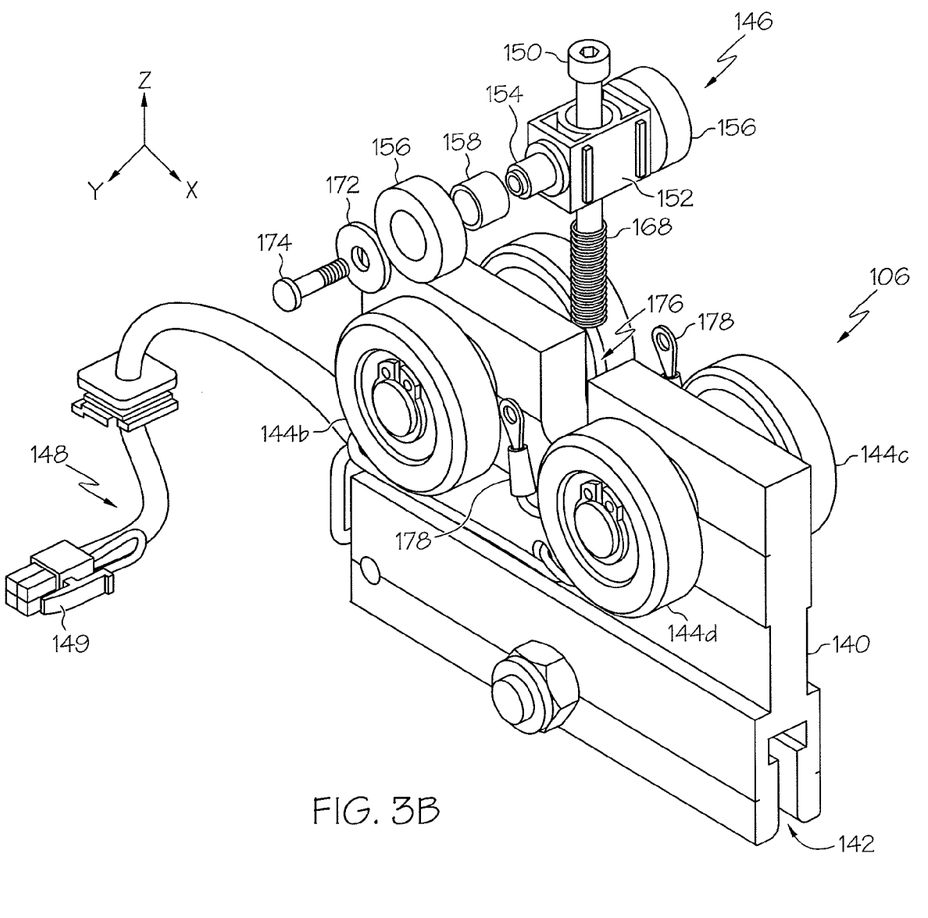
FIG. 3B schematically depicts a partially exploded view of the carriage of FIG. 3A.

Referring now to FIGS. 3A and 3B, the carriage 106 generally comprises a carriage body 140 to which a plurality of support wheels 144a, 144b, 144c, and 144d are rotatably attached for supporting the carriage 106 in the rail. The support wheels 144a, 144b, 144c, and 144d facilitate positioning the carriage 106 and lift unit along the length of the rail. In the embodiments described herein, the carriage 106 is depicted with four support wheels. However, it is contemplated that the carriage 106 may be constructed with fewer than 4 support wheels. For example, in some embodiments, the carriage may be constructed with one or two support wheels (i.e., a pair of support wheels). Accordingly, it should be understood that the carriage 106 includes at least one support wheel. The support wheels 144a-d are positioned on axles 120 which extend transversely through the carriage body 140. Each support wheel is secured to the axle 120 with a fastener, such as retaining clips 122, such that the support wheels are rotatable on the axle 120.

In the embodiment of the carriage 106 depicted in FIGS. 3A and 3B, the support wheels 144a, 144b, 144c, and 144d are passive (i.e., the support wheels are not actively driven with a motor or a similar drive mechanism) and the lift unit is manually traversed along the rail. However, in alternative embodiments (not shown), the support wheels may be actively driven such as when the support wheels are coupled to a motor or a similar mechanism. In such embodiments, the drive mechanism may be communicatively coupled to a hand control (such as hand control 112 shown in FIG. 1) which actuates the drive mechanism and facilitates traversing the lift unit along the rail with the drive mechanism.

In the embodiments described herein, the carriage 106 further comprises at least one conductive roller 156 (two shown in FIGS. 3A and 3B). The conductive rollers 156 electrically couple the battery and/or the motor of the lift unit to a conductor positioned in the rail to which the lift unit is attached, as will be described in more detail herein. The conductive rollers 156 are formed from an electrically conductive material such as copper or a copper alloy, aluminum or an aluminum alloy, steel, or a similar conductive metallic material and/or alloy. Alternatively, the conductive rollers 156 may be formed from an electrically conductive polymer material. In the embodiments described herein, the conductive rollers are formed from an oil-bronze, specifically SNF-12 oil bronze. However, it should be understood that the conductive rollers may be formed from other conductive materials.

In the embodiments described herein, the conductive rollers 156 are rotatably attached to a conductor truck 146 which, in turn, is mounted to the carriage body 140. Specifically referring to FIG. 3B, the conductor truck 146 is formed from a polymeric material and includes at least one axle 154 to which the conductive rollers are rotatably attached. In the embodiment of the conductor truck 146 shown in FIG. 3B, the axle 154 is integrally formed with the conductor truck 146. However, in other embodiments, the axles 154 may be independent of the conductor truck 146, such as when a separate axle is utilized in conjunction with the conductor truck 146.

The conductive rollers 156 are positioned on the axles 154 of the conductor truck 146 and a spacer 158 is positioned between the conductive roller 156 and the axle 154 to facilitate rotation of the conductive roller 156 on the axle 154. In the embodiments described herein, the spacer 158 is formed from an electrically conductive material, such as steel. However, it should be understood that the spacer 158 may be formed from other electrically conductive materials, including, without limitation, other electrically conductive metals and alloys and/or electrically conductive polymeric materials. The conductive rollers 156 are secured on their respective axles 154 with a fastener 174 and a washer 172, both of which are electrically conductive. Specifically, the washer 172 is sized such that the washer is in direct contact with the conductive roller 156 and/or the spacer 158 when the conductive roller 156 is secured on the conductor truck 146 with screw 147.

As noted hereinabove, the conductor truck 146 is attached to the carriage body 140. Specifically, the carriage body 140 comprises a cutout feature 176 formed in an upper portion of the carriage body 140. The conductor truck 146 is positioned in the cutout feature 176 with a biasing member 168, such as a compression spring or another suitable biasing member, positioned between the conductor truck 146 and the carriage body 140. The conductor truck 146 is secured to the carriage body 140 with a fastener 150 which extends through the conductor truck 146 and the biasing member 168 and into the carriage body 140. The fastener prevents the lateral movement of the conductor truck 146 with respect to the carriage body. When the conductor truck 146 is installed in the cutout feature 176 and secured with fastener 150 the biasing member 168 bias the conductor truck 146 and the conductive rollers 156 upwards (i.e., in the z-direction in the coordinate axes depicted in FIG. 3B) and away from the carriage body 140. Accordingly, it should be understood that, when the carriage 106 is installed in the rail 102 (FIG. 2), the biasing member 168 biases the conductive rollers 156 into rolling engagement with the conductors 114*a*, 114*b* (FIG. 2) positioned on an upper portion of the rail 102.

Referring to FIGS. 2 and 3A-3B, the carriage 106 further comprises a power lead 148 electrically coupled to the conductive rollers 156. Specifically, the power lead 148 comprises a plurality of electrical conductors (i.e., wires) which are coupled to an interface connector 149 on one end and the conductive rollers 156 on the opposite end. The electrical connection with the conductive rollers 156 is facilitated by eye connectors 178, or similar electrical connectors, which are in electrical contact with the fastener 174 and/or washer 172. Specifically, the fastener 174 is inserted through the eye connector 178 such that the eye connector 178 is positioned between the fastener 174 and the washer 172. The power lead 148 conducts current from the conductive rollers 156 to the lift unit 104, as will be described in more detail herein.

Figure 4:
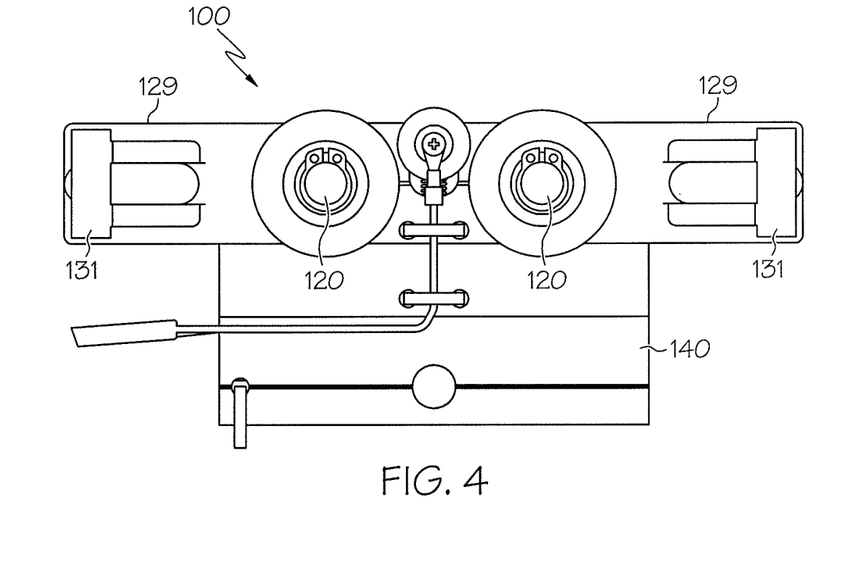
FIG. 4 schematically depicts a side view of a carriage for use with the rail-mounted lift system of FIG. 1.

Referring now to FIGS. 1 and 4, in some embodiments, the carriage 106 may further comprise bumper assemblies 129 positioned on either end of the carriage body 140. The bumper assemblies may be attached to the carriage body 140 and secured in place with the axles 120 which extend transversely through the carriage body 140. The bumper assemblies 129 may include rubber end caps 131 which cushion the carriage 106 when the carriage 106 encounters an end stop 192 located at either end of the rail 102. In the embodiments of the carriage 106 described herein, the bumper assemblies 129 are optional and, as such, it should be understood that the carriage 106 may be constructed without the bumper assemblies.

Figure 6:
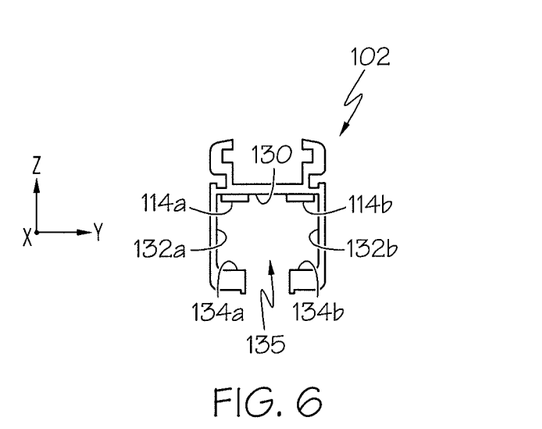
FIG. 6 schematically depicts a cross section of a rail of the rail-mounted lift system according to one or more embodiments described herein.

Referring to FIGS. 2 and 6, the lift system 100 further comprises a rail 102 in which the carriage 106 is slidably disposed for relative movement to the rail 102. Accordingly, it should be understood that, when the lift unit 104 is mechanically coupled to the carriage 106, the lift unit may be traversed along the rail with the carriage 106. In the embodiment of the rail 102 shown in FIG. 6, the rail 102 is generally formed from a metallic material, such as aluminum, an aluminum alloy, or a similar metallic material, and generally comprises an upper portion 130, a first sidewall 132*a* integrally formed with the upper portion 130, and a second sidewall 132*b* integrally formed with the upper portion 130. The upper portion 130, first sidewall 132*a* and second sidewall 132*b* are oriented such that the upper portion 130, first sidewall 132*a* and second sidewall 132*b* form a carriage support channel 135 in which the carriage 106 is slidably disposed. To that end, the first sidewall 132*a* further comprises a first support flange 134*a* which extends from the first sidewall 132*a* into the support channel 135 and the second sidewall 132*b* further comprises a second support flange 134*b* which extends from the second sidewall 132*b* into the support channel 135. In the embodiments described herein, the first support flange 134*a* and the second support flange 134*b* are generally opposed to one another and lie in a common horizontal plane (i.e., the x-y plane in the coordinate axes shown in FIG. 6). The first support flange 134*a* and the second support flange 134*b* may also be substantially parallel with the upper portion 130 of the rail 102. However, it should be understood that other configurations of the support flanges and the upper portion of the rail are also contemplated. For example, in an alternative embodiment, the support flanges may be upwardly angled with respect to the horizontal plane. Moreover, it should be understood that the structure of the rail 102 depicted in FIGS. 2 and 6 is exemplary and that other rail configurations are contemplated.

Still referring to FIGS. 2 and 6, the lift system 100 further comprises a pair of conductors 114*a*, 114*b* positioned in the support channel 135 on the upper portion 130 of the rail 102. When the carriage 106 is installed in the rail 102, the conductive rollers 156 of the carriage are biased into rolling engagement with the conductors 114*a*, 114*b* such that current passing through the conductors 114*a*, 114*b* is communicated to the conductive rollers 156 and, in turn, to the power lead 148. The conductors 114*a*, 114*b* may be formed from various conductive materials.

Figure 7:
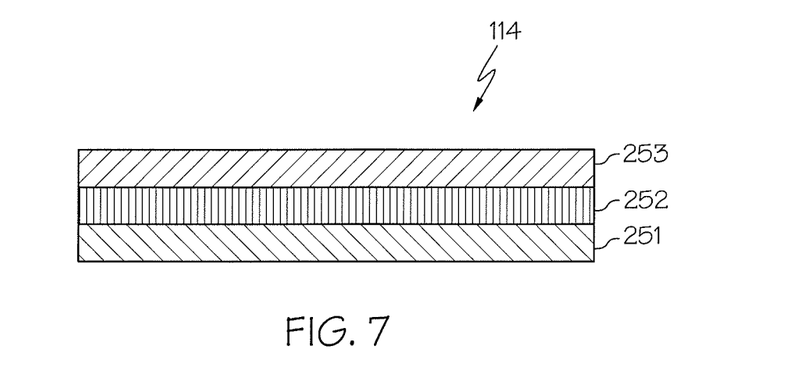
FIG. 7 schematically depicts a cross section of one embodiment of a conductive tape for use with the rail mounted lift system of FIG. 1, according to one or more embodiments described herein.

For example, referring now to FIGS. 6 and 7, one embodiment of a conductor 114 for use in the rail 102 of the lift system 100 is schematically depicted in cross section. In this embodiment, the conductor 114 is a flexible conductive tape which generally comprises an insulating layer 253, a primary conductive layer 252, and a protective layer 251. The layers are ordered such that the primary conductive layer 252 is positioned between the insulating layer 253 and the protective layer 251. When the conductor 114 is positioned in the upper portion 130 of the rail 102, as described above, the insulating layer 253 is positioned closest to the upper portion of the rail 102 while the protective layer 251 is furthest from the upper portion of the rail.

In one embodiment, the insulating layer 253 is formed from an electrically insulating material, such as an insulating polymeric material, which also functions to adhesively bond the conductor 114 to the upper portion of the rail 102. For example, the insulating polymeric material may be polyethylene terephthalate (PET) or a similar polymeric material. The insulating layer 253 may generally have a thickness of less than about 100 um. For example, in one embodiment, the PET has a thickness of about 50 um. The insulating layer 253 prevents current conducted through the primary conductive layer 252 from being conducted to the rail 102 when the conductor is positioned on the upper portion of the rail 102. The insulating layer may be adhesively bonded to the rail with an adhesive material. For example, in one embodiment, the insulating layer 253 is bonded to the upper portion of the rail 102 with a double-sided adhesive tape, such as, for example, 9495 LE adhesive tape manufactured by 3M.

The primary conductive layer 252 is formed from an electrically conductive material such as copper or a copper alloy. For example, in one embodiment, the electrically conductive tape is formed from E-Cu58 copper alloy. However, it should be understood that the primary conductive layer 252 may be formed from other conductive materials including, without limitation, other elemental metallic materials and/or alloys thereof. The primary conductive layer 252 may generally have a thickness of less than about 100 um. For example, in one embodiment, the primary conductive layer 252 has a thickness of about 50 um. In one embodiment, the primary conductive layer 252 comprises multiple layers of conductive material, such as when the primary conductive layer 252 is constructed of two or more layers of conductive material such as copper or a copper alloy. The primary conductive layer 252 may be bonded to the insulating layer 253 with an adhesive material. For example, in one embodiment, the primary conductive layer 252 is adhesively bonded to an insulating layer 253 with a double-sided adhesive tape such as, for example 55256 double-sided adhesive tape manufactured by 3M.

The protective layer 251 is formed from a polymeric material. For example, the polymeric material may be a polyester, such as a polyester fabric. Alternatively, the polymeric material may be a polymeric film. In one embodiment, the protective layer is a polyester fabric coated with a conductive material such as, for example, CN-3190 conductive fabric tape manufactured by 3M which is coated on one side with an electrically conductive acrylic adhesive. The protective layer 251 may generally have a thickness of less than about 200 um. For example, in one embodiment, the protective layer has a thickness of less than about 180 um. When the conductor 114 is positioned on the upper portion of the rail 102, the conductor 114 is oriented such that the conductive rollers of the carriage are in rolling engagement with the protective layer 251, thereby enabling current flowing through the primary conductive layer 252 to pass through the protective layer 251 to the conductive rollers. While the protective layer 251 facilitates passing current from the primary conductive layer 252 to the conductive rollers, the protective layer also protects the primary conductive layer 252 from wear and/or corrosion. For example, the protective layer 251 provides a barrier between the primary conductive layer 252 and the outside environment. Moreover, the protective layer 251 mitigates wear and/or other mechanical damage as the conductive rollers of the carriage are rolled along the conductor 114.

Referring again to FIG. 2, the lift system 100 further comprises a connector card 160 which couples the conductors 114a, 114b to a power source, such as an electrical outlet. The connector card 160 generally comprises a plurality of spring contacts 162 which engage with the conductors 114a, 114b when the connector card 160 is installed in the rail 102. The connector card 160 further comprises a power port 164 which is electrically coupled to the spring contacts 162. The power port 164 is configured to receive an adapter plug 163, which, in turn, may be coupled to a power source (not shown) for providing current to the connector card 160 and the conductors 114a, 114b.

In the embodiments described herein, the connector card 160 may be mechanically coupled to an adapter 190 to facilitate positioning the connector card 160 in the support channel of the rail 102. In some embodiments, the adapter 190 may further comprise an end stop 192 which provides cushioning to the adapter 190 and connector card 160 when the adapter is contacted by the carriage 106.

Figure 8:
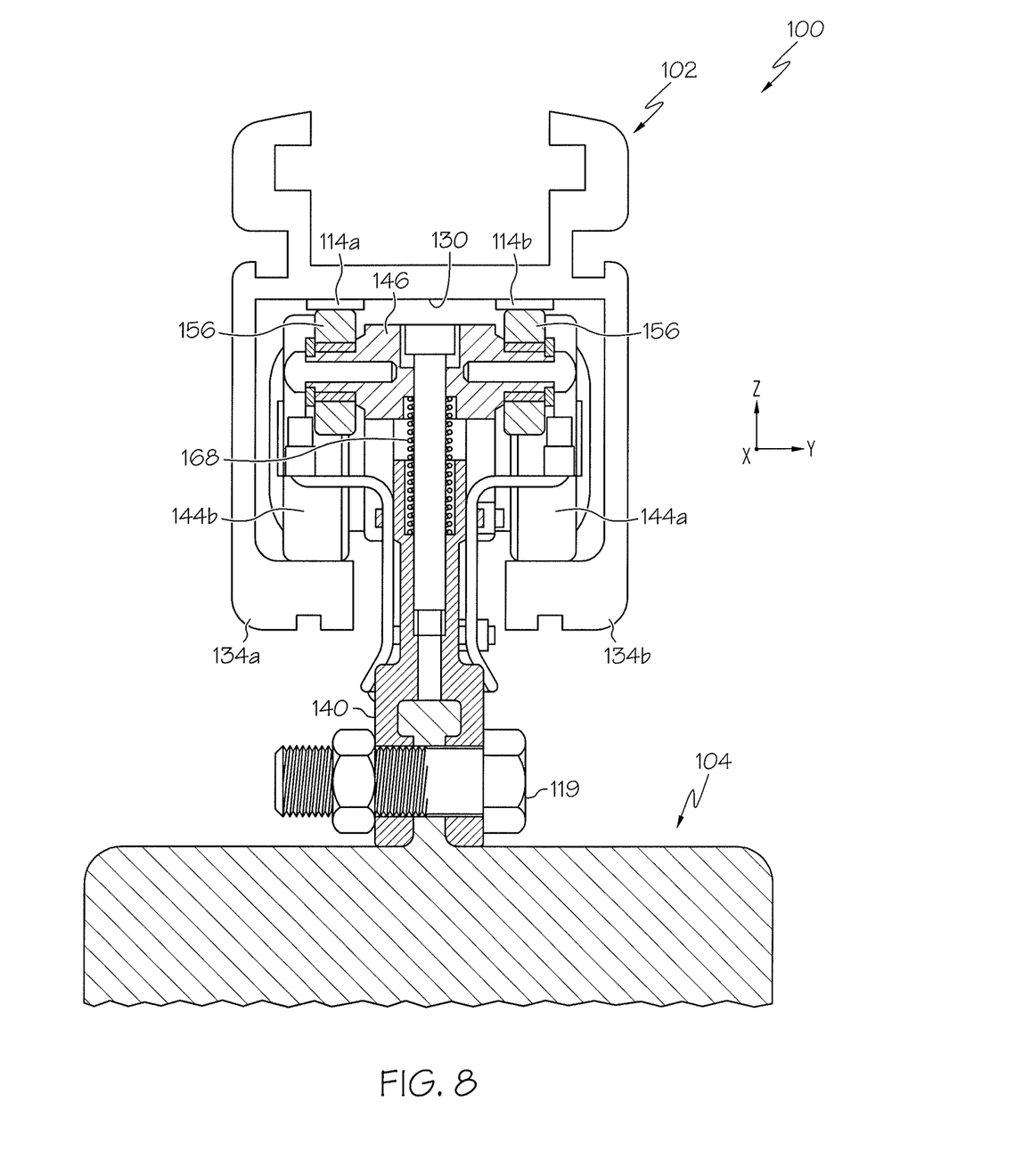
FIG. 8 schematically depicts a cross section of a rail-mounted lift system according to one or more embodiments shown and described herein.

The construction of the rail-mounted lift system 100 will now be described with specific reference to the exploded view of the lift system 100 shown in FIG. 2 and the cross section of the assembled lift system 100 shown in FIG. 8. The conductors 114a, 114b are adhesively attached to the upper portion 130 of the rail 102 such that the conductors 114a, 114b extend along the length of the rail 102. An insulating pad 180 may be positioned between the conductors 114a, 114b and the upper portion 130 of the rail proximate the end of the rail 102.

Figure 9:
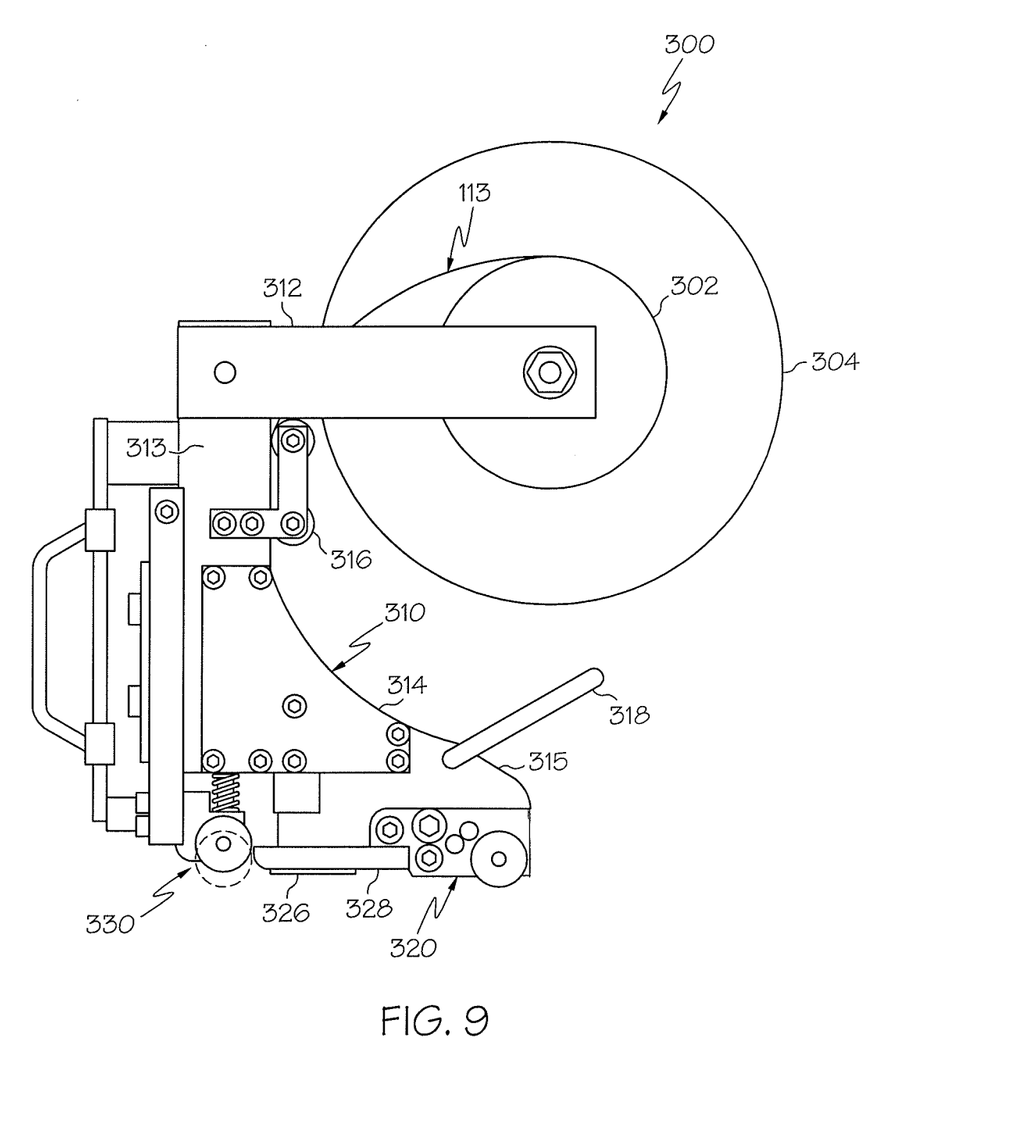
FIG. 9 schematically depicts an applicator tool for applying a conductor to the rail of the rail-mounted lift system.

In one embodiment, the conductors 114a, 114b may be installed in the rail 102 utilizing an applicator tool 300, as depicted in FIG. 9. The applicator tool 300 generally comprises an applicator frame assembly 310 and a spindle 302 to which a spool of wound conductor may be attached. The applicator frame assembly 310 generally includes an extension body 313, a support arm assembly 312 and a dolly portion 315. The support arm assembly 312 is mechanically coupled to the extension body 313 and supports the spindle 302 such that the spindle 302 is free to rotate in the support arm assembly 312. The dolly portion 315 is coupled to the extension body 313 with sideplates 314 (one shown in FIG. 9).

Figure 10:
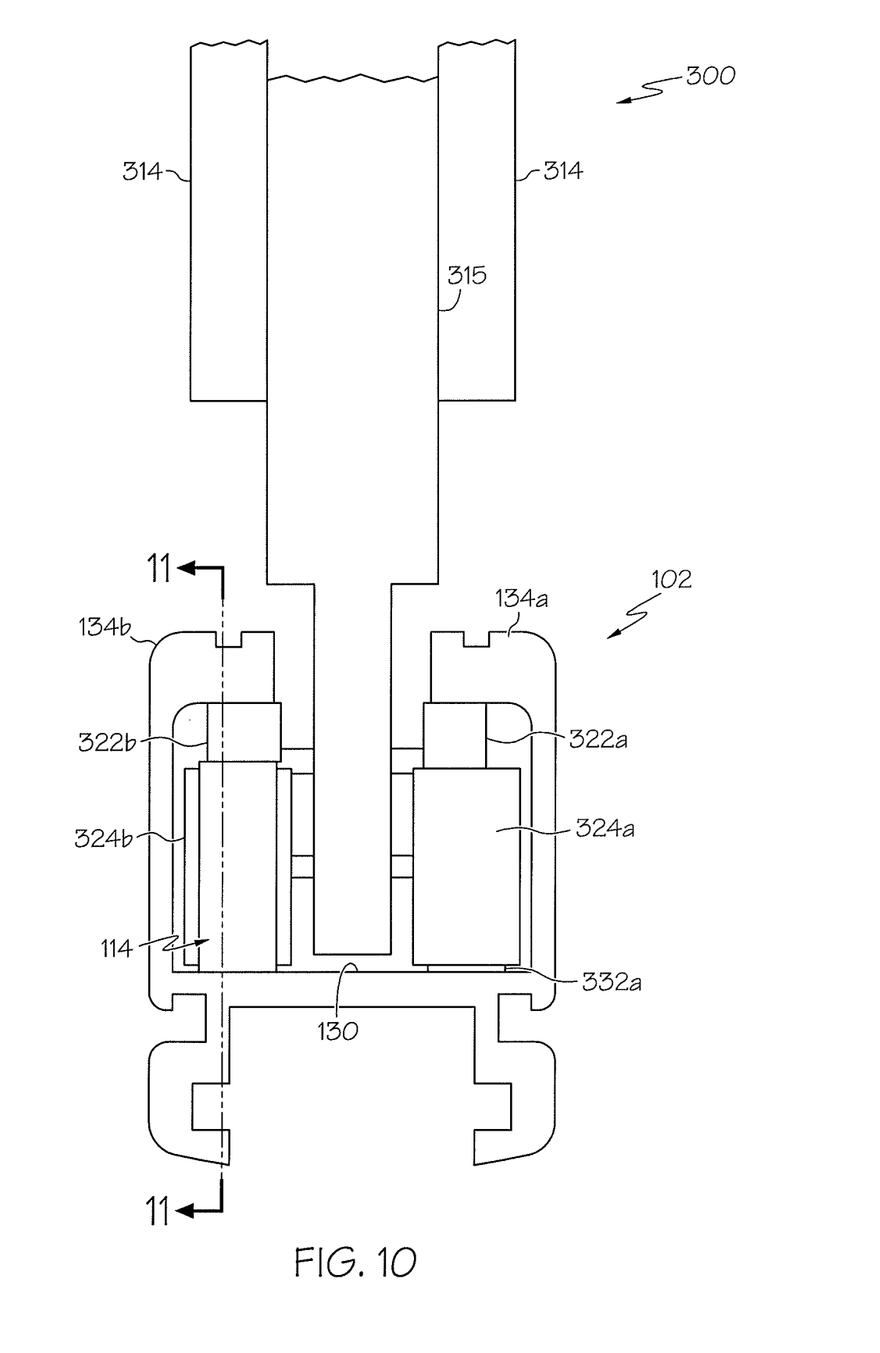
FIG. 10 schematically depicts the applicator tool of FIG. 9 being used to install a conductor in the rail of the rail-mounted lift system.
Figure 11:
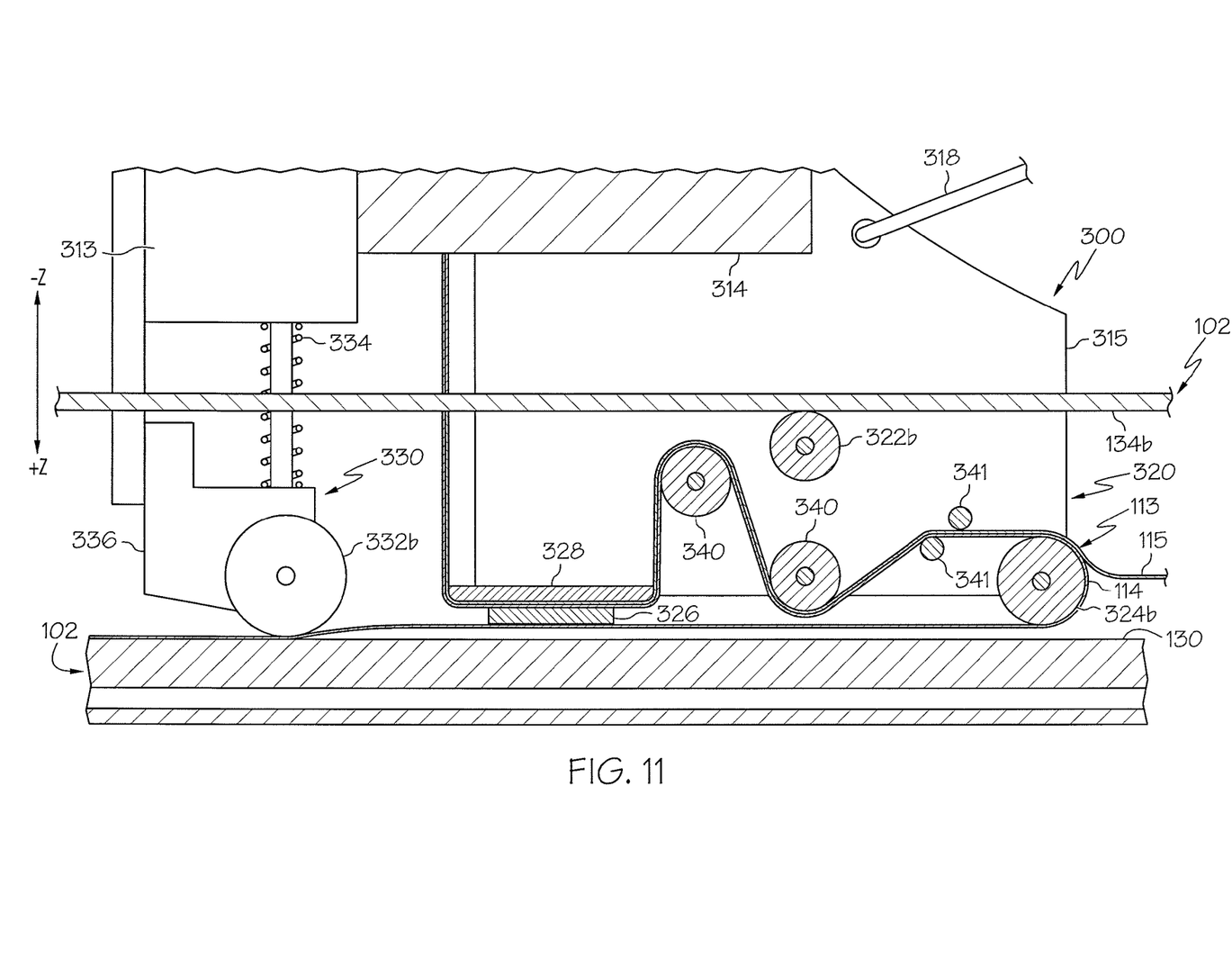
FIG. 11 schematically depicts the applicator tool of FIG. 9 being used to install a conductor in the rail of the rail-mounted lift system.

Referring to FIGS. 9-11, the dolly portion 315 of the applicator tool 300 generally includes a contact roller mechanism 330 for impinging the conductor against the rail and a tensioning mechanism 320 for tensioning the conductor as it is paid-out from the spindle 302. The dolly portion 315 further comprises a dolly portion shoe 328 and a normalizing plate 326 which work in conjunction with one another to guide the conductor through the applicator tool 300 and into the tensioning mechanism 320. A lanyard 318 may be attached to the dolly portion 315 to assist in traversing the applicator tool 300 through the rail during application of the conductor to the rail.

The tensioning mechanism of the dolly portion 315 includes a pair of flange engagement wheels 322a, 322b positioned to engage the support flanges 134a, 134b of the rail 102 and thereby guide the applicator tool 300 in the rail 102. Similarly, the contact roller mechanism 330 contains a pair of contact wheels 332a, 332b positioned to engage the upper portion 130 of the rail 102 and thereby guide the applicator tool 300 in the rail 102 while simultaneously laminating the conductor to the rail 102, as will be described further herein.

Referring specifically to FIG. 11, the contact roller mechanism 330 includes a contact wheel 332 that is coupled to the applicator frame assembly 310 through a follower mechanism 336. The contact wheel 332 and the follower mechanism 336 are configured to translate inward and outward (i.e., in the +/−z-direction as shown in FIG. 11) relative to the applicator frame assembly 310. To facilitate this translation, the contact roller mechanism 330 includes a biasing member 334 that applies a force to the follower mechanism 336 and the contact wheel 332 in a direction that tends to position the contact wheel 332 and the follower mechanism 336 in a direction away from the applicator frame assembly 310, which, in the embodiment shown in FIG. 11, is the positive z-direction.

Still referring to FIG. 11, the tensioning mechanism 320 further comprises a plurality of roller elements 340, guide pins 341 and a pair of reversing wheels 324a, 324b (one shown in FIG. 11) through which the conductor laminate 113 may be wound in order to maintain tension on the conductor 114 as the conductor is applied to the rail 102.

Referring again to FIGS. 9-11, to install the conductor in the rail 102, a length of conductor laminate 113 (i.e., the conductor 114, as described hereinabove, and a backing tape 115 applied to the adhesive layer) is arranged in a spool 304 and placed about the spindle 302 of the applicator tool 300. The conductor laminate 113 is fed from the spool 304 and directed between the extension body 313 and an extension body follower 316 that is coupled to the extension body 313. The conductor laminate 113 is passed between the applicator sideplates 314 and directed to the dolly portion 315, as shown in greater detail in FIG. 11, where the conductor laminate 113 is introduced into the tensioning mechanism 320. Specifically, the conductor laminate 113 first passes over a dolly portion shoe 328, and is wound through the plurality of roller elements 340 and pins 341 that form the tensioning mechanism 320, and directed over the reversing wheel 324. At the reversing wheel 324, the backing material 115 is removed from the conductor 114, thereby exposing the adhesive layer of the conductor 114. With the adhesive layer of the conductor 114 exposed, the conductor 114 may be directed over the reversing wheel 324, over the normalizing plate 326, and beneath a contact wheel 332 of the contact roller mechanism 330. As is depicted in FIG. 11, as the conductor laminate 113 passes through the tensioning mechanism 320, any twisting, for example, due to winding the conductor laminate 113 about the spindle 302, is minimized, such that the conductor laminate 113 will generally lie flat when being applied to the rail 102.

Referring now to FIGS. 10 and 11, once the conductor laminate 113 is loaded into the applicator tool 300, the applicator tool 300 is positioned in the rail 102 such that the flange engagement wheels 322a, 322b engage the support flanges 134a, 134b of the rail 102 and the contact wheels 332a, 332b engage the upper portion 130 of the rail 102. With the applicator tool 300 in this position, the contact wheel 332b impinges the conductor 114 against the upper portion 130 of the rail 102 thereby laminating the conductor 114 to the rail. Thereafter, the applicator tool 300 is translated along a length of the rail 102 by a user. As the applicator tool 300 is translated along the rail 102, additional conductor is paid out from the spindle 302, passes through the applicator tool 300, and below the contact roller mechanism 330 such that the conductor 114 is applied to the length of the rail. As the applicator tool passes through the rail, the biasing member 334 applies pressure through the contact wheel 332 to the conductor 114 as the applicator tool 300 is translated forward along the rail 102. The pressure exerted by the contact wheel 332 secures the conductor 114 to the rail 102 by pressing the adhesive layer of the conductor 114 against the upper portion of the rail 102. A user may grasp the lanyard 318 coupled to the applicator frame assembly 310 to translate the applicator tool 300 along the rail 102. Two conductors 114 (i.e., the first conductor 114a and the second conductor 114b, as depicted in FIGS. 6 and 8) may be applied to the rail by first translating the applicator tool 300 along the rail 102 from a first end to a second end, then rotating the applicator tool 300 within the rail 102 as to translate the applicator tool 300 from the second end to the first end of the rail 102. Thus, the applicator tool 300 can place the first conductor 114a and the second conductor 114b such that they are approximately evenly spaced in a lateral direction across the rail 102.

Referring again to FIGS. 2 and 8, after the conductors 114a, 114b are installed in the rail, the carriage 106 is installed on the lift unit 104 by inserting the connection rail 118 into the corresponding receiving slot 142 of the carriage 106 and securing the carriage 106 on the connection rail 118 with fastener 119. The lift unit 104 with attached carriage 106 is then suspended from the rail 102 by positioning the carriage 106 in the rail 102 such that the support wheels 144a, 144b are slidably engaged with the first support flange 134a and the second support flange 134b, respectively. With the carriage 106 in this position, the biasing member 168 biases the conductor truck 146 and the conductive roller 156 upwards (i.e., in the z-direction of the coordinate axes shown in FIG. 8) and away from the carriage body 140 such that the conductive rollers are in rolling engagement with and electrically coupled to the conductors 114a, 114b, as depicted in FIG. 8. The power lead 148 is also electrically coupled to the battery and/or motor of the lift unit 104.

Thereafter, the connector card 160 and adapter 190 are inserted into rail 102 such that the spring contacts 162 positioned on the connector card are engaged with the conductors 114a, 114b. The connector card 160 and adapter 190 are secured in the rail 102 with fastener 121, such as a bolt and nut, and the adapter plug 163 is inserted in the power port 164 thereby providing power to the lift system 100.

Referring now to FIGS. 1, 2 and 5, the lift unit 104 may be traversed over the rail 102 with the carriage 106. As the lift unit 104 is traversed over the rail 102, current provided to the conductors 114 through connector card 160 is communicated to the conductive rollers 156 which are in rolling engagement with the conductors 114. The current passes from the conductors 114 through the power lead 148 to the lift unit 104 thereby providing power to charge the battery 132 and/or operate the motor 133. For example, in embodiments where the lift unit 104 includes a battery 132, as shown in FIG. 5, the current from the power lead charges the battery and may also power the motor. In these embodiments, the motor 133 may be actuated with either current from the battery 132 or current supplied directly from the power lead 148. Alternatively, in embodiments (not shown) where the lift unit 104 does not include a battery 132, the current supplied to the lift unit 104 with the power lead 148 directly powers the motor 133.

Moreover, because the conductors 114a, 114b extend along the entire length of the rail 102 and the conductive rollers 156 are in rolling engagement with the conductors 114a, 114b as the lift unit 104 is traversed over the length of the rail 102, it should be understood that power is continuously provided to the lift unit irrespective of the position of the lift unit 104 relative to the rail 102 (i.e., power is provided to the lift unit at every point along the length of the rail).

In the embodiments described herein and shown in the figures, the lift system 100 is constructed with the carriage 106, conductors 114a, 114b, and connector card 160 to facilitate charging and/or providing power to the lift unit 104 at any point along the length of the rail 102. However, it is also contemplated that certain components of the lift system 100 may be separately provided as a kit of parts which may be used to retro fit lift systems which do not have continuous charging capabilities. For example, in one embodiment, a kit of parts for retrofitting a rail-mounted lift system for continuous charging of a lift unit along a length of a rail may include a conductor and a carriage which are packaged together. In one embodiment, the conductor is a flexible conductive tape as depicted in FIG. 7 and described hereinabove, although it should be understood that other conductors suitable for use in a rail-mounted lift system may be included in the kit of parts. In one embodiment, the carriage may include a carriage body, at least one support wheel rotatably coupled to the carriage body, and a conductor truck, as described hereinabove and depicted in FIGS. 3A and 3B. In this embodiment, the conductor truck includes at least one conductive roller rotatably attached to the conductor truck and the conductor truck is mounted to the carriage body with a biasing mechanism for upwardly biasing the at least one conductive roller away from the carriage body, as described above.

In another embodiment, the kit of parts may further comprise a connector card for electrically coupling the conductor and the carriage to a power source. In this embodiment, the kit of parts may optionally include an adapter for positioning the conductor card in the rail of a lift system and an end stop. The kit of parts may also optionally include a plug adapter and the corresponding power supply for electrically coupling the connector card to line voltage.

As noted above, the kit of parts may be used to retrofit and convert an existing rail-mounted lift system to a rail-mounted lift system with continuous charging capabilities. The various parts of the kit of parts may be installed in the rail of the existing lift system as described herein above thereby converting the existing lift system to a continuous charging system.

Based on the foregoing, it should now be understood that the embodiments shown and described herein relate to a rail-mounted lift system for lifting and supporting patients. The lift system includes a lift unit which is supplied with current along the entire length of the rail to which the lift unit is attached. The current supplied to the lift system may be used to either directly power a motor of the lift unit and/or charge a battery of the lift unit at any point along the length of the rail. In this manner, the lift unit can be powered by the line current or, when the line current is discontinued such as during a power failure, the lift unit can be powered by the battery.

In some embodiments, the rail-mounted lift system includes conductors formed from a flexible conductive tape having a primary conductive layer disposed between an insulating adhesive layer and a protective layer. The insulating adhesive layer facilitates installation of the conductor on a rail without modifying the rail. Moreover, the protective layer encapsulates the primary conductive layer thereby preventing degradation of the primary conductive layer due to exposure to environmental conditions and permitting the conductor to be used in lift systems installed in humid environments (i.e., over therapy pools and the like). Further, the protective layer also mitigates wear on the primary conductive layer as the conductive rollers of the carriage are brought into rolling engagement with the conductor.

Also described herein is a kit of parts for retrofitting and converting an existing rail-mounted lift system to a rail-mounted lift system in which the lift unit can be continuously charged and/or powered along the entire length of the rail, as described herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An applicator tool comprising:
   a spindle;
   an applicator frame assembly including a support arm assembly coupled to the spindle; and
   a dolly portion coupled to the support arm assembly, the dolly portion comprising:
      a pair of flange engagement wheels for engaging support flanges of a rail;
      a contact roller mechanism for impinging a conductor against an upper portion of the rail; and
      a biasing member coupled to the contact roller mechanism and the dolly portion, wherein the biasing member applies a force to the contact roller mechanism in a direction away from the applicator frame assembly.

2. The applicator tool of claim 1, wherein the contact roller mechanism further comprises a follower mechanism coupled to the applicator frame assembly and a contact wheel coupled to the follower mechanism, wherein the contact wheel impinges the conductor against the upper portion of the rail.

3. The applicator tool of claim 1, further comprising a tensioning mechanism coupled to the applicator frame assembly, the tensioning mechanism comprising a reversing wheel that separates a backing tape from the conductor.

4. The applicator tool of claim 1, further comprising a tensioning mechanism that includes a plurality of roller elements and pins that apply tension to the conductor.

5. The applicator tool of claim 1, further comprising a tensioning mechanism and wherein the dolly portion further comprises a dolly portion shoe and a normalizing plate positioned opposite the dolly portion shoe, wherein the dolly portion shoe and the normalizing plate are configured to guide the conductor through the tensioning mechanism.

6. A method for applying a conductor to a rail, the method comprising:
   positioning an applicator tool that comprises an applicator frame assembly in the rail;
   contacting support flanges of the rail with a pair of flange engagement wheels of the applicator tool;
   directing a conductor laminate from a spool to a dolly portion of the applicator tool;
   separating a backing tape from the conductor of the conductor laminate;
   impinging the conductor between a contact wheel of the applicator tool and an upper portion of the rail; and
   translating the applicator tool along a length of the rail, thereby applying the conductor to the length of the rail.

7. The method of claim 6, wherein impinging the conductor comprises applying a force to the contact wheel in a direction away from the applicator frame assembly.

8. The method of claim 7, wherein a biasing member applies the force to the contact wheel.

9. The method of claim 6, wherein separating the backing tape comprises directing the conductor laminate over a reversing wheel.

10. The method of claim 6, further comprising directing the conductor laminate through a tensioning mechanism comprising a plurality of roller elements and pins that apply a tension to the conductor laminate.

11. The method of claim 6, further comprising directing the conductor laminate over a dolly portion shoe into a tensioning mechanism.

12. The method of claim 6, further comprising directing the conductor through a tensioning mechanism and directing the conductor over a normalizing plate subsequent to directing the conductor through the tensioning mechanism.

13. A method for assembling a rail-mounted lift system that includes a lift unit and a rail, the method comprising:
positioning an applicator tool that comprises an applicator frame assembly in the rail;
contacting support flanges of the rail with a pair of flange engagement wheels of the applicator tool;
directing a conductor laminate from a spool to a dolly portion of the applicator tool;
separating a backing tape from a conductor of the conductor laminate;
impinging the conductor between a contact wheel of the applicator tool and an upper portion of the rail;
translating the applicator tool along a length of the rail, thereby applying the conductor to the length of the rail; and
inserting a carriage of the lift unit into the rail such that conductive rollers of the carriage are in contact with the conductor.

14. The method of claim 13, wherein impinging the conductor comprises applying a force to the contact wheel in a direction away from the applicator frame assembly.

15. The method of claim 14, wherein a biasing member applies the force to the contact wheel.

16. The method of claim 13, wherein separating the backing tape comprises directing the conductor laminate over a reversing wheel.

17. The method of claim 13, further comprising directing the conductor laminate through a tensioning mechanism comprising a plurality of roller elements and pins that apply a tension to the conductor laminate.

18. The method of claim 13, further comprising directing the conductor laminate over a dolly portion shoe into a tensioning mechanism.

19. The method of claim 13, further comprising directing the conductor through a tensioning mechanism and directing the conductor over a normalizing plate subsequent to directing the conductor through the tensioning mechanism.

20. The method of claim 13, further comprising inserting a connector card into the rail such that the connector card is coupled to the conductor, and connecting the connector card to a power port to provide power to the rail-mounted lift system.

* * * * *